United States Patent Office 3,770,791
Patented Nov. 6, 1973

3,770,791
PREPARATION OF 3-TRIMETHYLSILYL-LOWER ALKYL PROPIOLATE
Joseph G. Atkinson, Montreal, Quebec, and Patrice Belanger, Dollard des Ormeaux, Quebec, Canada, assignors to Merck Sharp & Dohme (I.A) Corp., New York, N.Y.
No Drawing. Filed July 18, 1972, Ser. No. 273,007
Claims priority, application Canada, Dec. 22, 1971, 130,887
Int. Cl. C07f 7/08
U.S. Cl. 260—448.2 E  3 Claims

ABSTRACT OF THE DISCLOSURE

The preparation of 3-(trimethylsilyl) lower alkyl propiolate by the reaction of a lower alkyl propiolate and chlorotrimethylsilane in the presence of dry benzene and triethylamine is described. The product is a useful intermediate in the preparation of sodium 3-trimethylsilyltetradeuteriopropionate, a known useful water-soluble standard for $^1$H-NMR, or in the preparation of the emulsifying agent, 3-trimethylsilylpropionic acid.

---

This invention is concerned with a novel method for preparing trimethylsilyl lower alkyl propiolate by silylation of a lower alkyl ester of propiolic acid. Trimethylsilyl lower alkyl propiolate is a key intermediate in the synthesis of the alkali or quaternary ammonium salt of 3-trimethylsilylpropionic acid, an emulsifying agent for polysiloxane oil, and sodium 3-trimethylsilylpropionate-2,2,3,3-$d_4$, a compound known to be a water-soluble standard for $^1$H-NMR as reported by L. Pohl et al., Angewandte Chemie, Ind. Ed. 8, column 380 (1969).

Pohl et al. outlined a two-step procedure for the preparation of 3-(trimethylsilyl) methyl propiolate in the sequence of reactions followed in the preparation of the useful end product, sodium 3-trimethylsilyltetradeuteriopropionate. It was found by applicants herein however that by employing the unique combination of triethylamine and dry benzene that 3-(trimethylsilyl) methyl or lower alkyl propiolate could be prepared in one step from a lower alkyl propiolate and chlorotrimethylsilane. By employing the process of this invention it is possible to obtain this needed intermediate in a yield equivalent to that of the prior art but in a much shorter period of time and with only one purification rather than two purification steps being required.

The process of this invention comprises reacting the selected lower alkyl ester of propiolic acid with chlorotrimethylsilane in the presence of triethylamine and dry benzene. Approximately equimolar amounts of propiolate, chlorotrimethylsilane and triethylamine are employed although one or another of these may be used in excess without interfering with the end result. Advantageously the propiolate, chlorotrimethylsilane and benzene are combined and triethylamine added thereto while maintaining the reaction mixture at about 60° C. Best results are obtained when the triethylamine is added slowly to the reaction mixture. The reaction comes to completion within about one-half hour or less and the product can be separated by quenching with water and extracting the products from the aqueous layer with benzene. The solvent then can be removed by any conventional method such as flash evaporation.

The trimethylsilyl lower alkyl propiolate thus obtained then can be converted to sodium 3-trimethylsilylpropionate or the 2,2,3,3-$d_4$ derivative thereof by the procedure described by Pohl et al., supra. In essence the process of conversion comprises reduction of the triple bond with deuterium to give 3-(trimethylsilyl) methyl propionate-$d_4$ which is then saponified to provide the sodium salt; reduction with hydrogen provides the light compound.

The following example will describe the novel process of this invention in more detail and the procedures appended thereto will illustrate the conversion of trimethylsilyl lower alkyl propiolate to the known and useful sodium 3-trimethylsilyltetradeuteriopropionate.

EXAMPLE 1

(3-trimethylsilyl) lower alkyl propiolate

Chlorotrimethylsilane (495 g., 4.56 mole) is placed in a 5-liter, 3-necked, round-bottomed flask fitted with a mechanical stirrer, condensor, drying tube, dropping funnel, thermometer and heating mantle. Benzene, previously dried over sodium (2 liters) is added and methyl propiolate (380 g., 4.50 mole) is added in one portion. The reaction mixture is heated to about 40° C. and triethylamine (470 g., 4.56 mole), dissolved in dry benzene (200 ml.) is added dropwise at approximately one drop per second. During the addition of the triethylamine the temperature of the reaction mixture increases to 60° C. and is maintained at this temperature throughout the addition. After all triethylamine is added, the reaction mixture is stirred at 60° C. for one-half hour, the reaction vessel cooled in a water bath and about 1 liter of water added to form two layers. The layers are separated and the aqueous layer extracted with benzene, the benzene layers are combined and then flash evaporated to a small volume and 3-(trimethylsilyl) methyl propiolate vacuum distilled yielding 310 g. (44%) of product, B.P. 60° C. (10 mm.).

By replacing the methyl propiolate employed in the above example by another lower alkyl propiolate such as ethyl, propyl and the like there is obtained the corresponding 3-(trimethylsilyl) lower alkyl propiolate.

PROCEDURE I

Sodium salt of 3-(trimethylsilyl) propionic acid-$d_4$

Step A.—Preparation of 3-(trimethylsilyl) methyl propionate-$d_4$: 3-(trimethylsilyl) methyl propiolate (310 g.) is placed in a hydrogenation bottle. The top of the liquid is flushed with nitrogen and 10% palladium on carbon (ca. 0.5 g.) added and the compound deuterogenated on the Parr apparatus until the desired amount of deuterium is absorbed. The product is removed by filtration and then vacuum distilled.

Step B.—Preparation of the sodium salt of 3-(trimethylsilyl) propionic acid-$d_4$: Deuterium oxide (650 ml.) is added to a 2-liter, 1-necked, round-bottomed flask having a magnetic stirrer, dropping funnel, condensor, drying tube and heating mantle. Sodium metal (45 g.) then is added to form approximately a 10% sodium deuteroxide solution. Stirring of the solution is begun and 3-(trimethylsilyl) methyl propionate (275 g., 1.7 mole) is added at a fast dropwise rate. Upon completion of the addition the reaction mixture is refluxed for about one-half hour and then cooled slowly with continued stirring. With continued stirring, 37% hydrochloric acid (200 g.) is added at a rapid dropwise rate. The insoluble acid is visible as the top layer, the small excess of hydrochloric acid used and the sodium chloride formed remain in the bottom layer. The top layer is separated and the acid layer is placed in a 2-liter beaker and water (600 ml.) added. The two-layer system is titrated with 2 N sodium hydroxide to pH 8 while cooling in an ice water bath. Ether is added, any precipitate then is removed by filtration and the filtrate flash evaporated yielding a syrupy residue which is taken up in isopropyl alcohol and again flash evaporated. The product then can be recrystallized from absolute alcohol and purified by redissolving in hot ethanol, the solution allowed to cool and solvent removed by flash evaporation providing a 90% yield of the sodium salt of 3-(trimethylsilyl) propionic acid-$d_4$ sodium salt, M.P. 310° C.

We claim:

1. A process for the preparation of 3-(trimethylsilyl) lower alkyl propiolate by the reaction of lower alkyl propiolate and chlorotrimethylsilane in the presence of dry benzene and triethylamine.

2. A process as claimed in claim 1 wherein the reaction mixture is maintained at about 60° C.

3. A process as claimed in claim 1 wherein methyl propiolate is employed to give 3-(trimethylsilyl) methyl propiolate.

References Cited

Pohl et al., "Angewandte Chemie," det. ed., 8, p. 380 (1969).

DANIEL E. WYMAN, Primary Examiner

P. F. SHAVER, Assistant Examiner